(No Model.)
R. P. ELLIOTT.
ADJUSTABLE MIRROR SUPPORT.
No. 434,659. Patented Aug. 19, 1890.
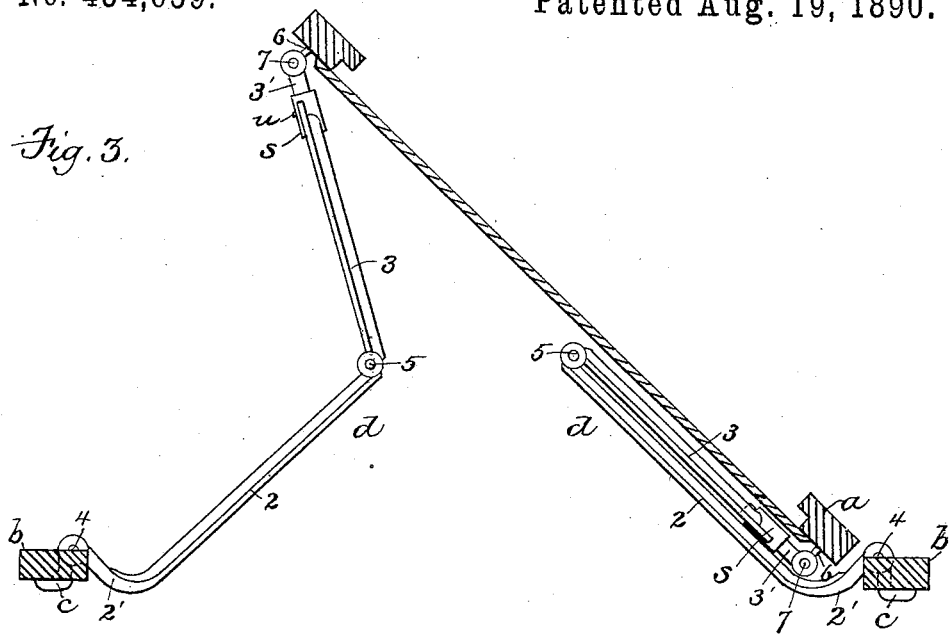
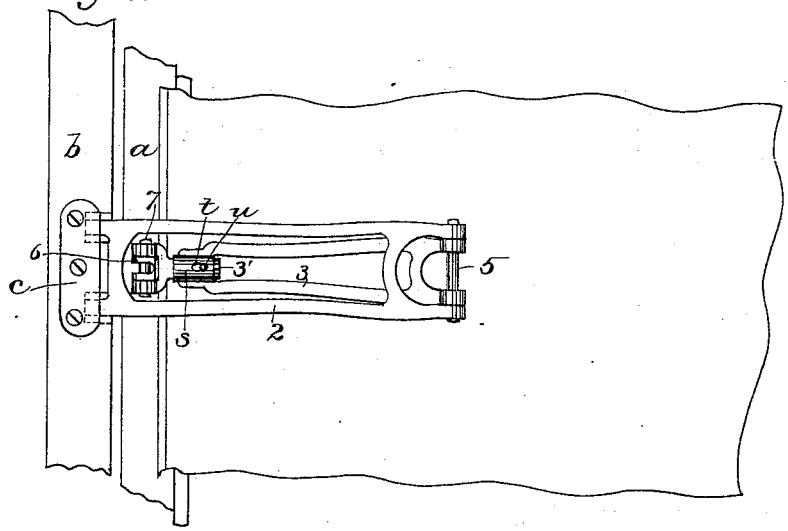
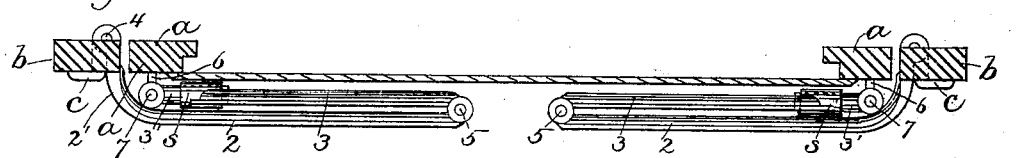
Witnesses
A. D. Harrison
W. C. Ramsay
Inventor
R. P. Elliott
by Wright Brown Crosley
Attys.

UNITED STATES PATENT OFFICE.

RICHARD P. ELLIOTT, OF SOMERVILLE, MASSACHUSETTS, ASSIGNOR TO CHARLES H. FRENCH, OF NASHUA, AND DAVID HEALD, OF MILFORD, NEW HAMPSHIRE.

ADJUSTABLE MIRROR-SUPPORT.

SPECIFICATION forming part of Letters Patent No. 434,659, dated August 19, 1890.

Application filed December 21, 1889. Serial No. 334,482. (No model.)

*To all whom it may concern:*

Be it known that I, RICHARD P. ELLIOTT, of Somerville, in the county of Middlesex and State of Massachusetts, have invented certain new and useful Improvements in Adjustable Mirror-Supports, of which the following is a specification.

My invention relates to toilet-mirrors supported by articles of furniture, like bureaus, the frame of the mirror being inclosed in a surrounding frame attached to the bureau or other articles.

The invention has for its object to provide improved means whereby a mirror may be moved bodily from and toward the surrounding frame which sustains it and can be inclined at various angles while standing at any point to which it may be bodily moved without coming in contact with the outside frame.

The invention consists in two jointed arms, each composed of an inner link connected at its inner end by a vertical pivot to an ear or hinge member adapted to be attached to the fixed frame on the bureau, and an outer link connected at its inner end by a vertical pivot to the swinging end of the inner link and connected at its outer end by a vertical pivot with a hinge member adapted to be secured to the mirror-frame. The said inner link is curved at its inner end, so that the pivot that connects it to the hinge member affixed to the outside frame may be located at the front inner corner of said frame, the curved form of the inner link enabling it to extend inwardly from the said pivot and stand behind the mirror-frame when the latter is pushed back to a position within the outside frame.

The invention also consists in the extensible or telescopic construction of the outer links. Said telescopic construction of the outer links enables the mirror-frame to be moved outwardly to bring the face of the mirror as near the front of the bureau as may be desired, while the described arrangement of the hinges connecting the jointed arms to the outside frame prevents either edge of the mirror from striking the outside frame during any of the movements of which it is capable.

In the accompanying drawings, forming a part of this specification, Figure 1 represents a horizontal section of a mirror and the outside frame, and a top view of my improved supporting devices. Fig. 2 represents a rear elevation of a portion of the mirror and of the outside frame and of one of the supporting devices or arms. Fig. 3 represents a horizontal section taken on the same plane as that shown in Fig. 1, the mirror being swung outwardly at an angle.

The same letters and figures of reference indicate the same parts in all the figures.

In the drawings, *a* represents the frame of a mirror, and *b* represents the outside frame, which is attached to a bureau and surrounds the mirror-frame.

*d d* represent the jointed arms that connect the mirror-frame *a* with the outside frame *b*, said arms embodying my present invention.

Each arm is composed of an inner link 2 and an outer telescopic link 3. The inner links are connected at their inner ends by vertical pivots 4 with brackets or hinge members *c*, attached to the outside frame *b*, said members *c* being formed to project outwardly from their points of attachment with the frame *b*, so that the pivots 4 4, that connect the jointed arms with the outside frame, are located on the front surfaces of the vertical parts of said frame and near the inner corners of said side pieces.

The telescopic links 3 3 are connected with the links 2 2 by vertical pivots 5 5 and have hinge members 6 6 at their outer ends adapted to be secured to the mirror-frame, said hinge members being connected to the outer ends of the telescopic links by vertical pivots 7 7. The construction of the outer links, whereby they are made telescopic or extensible and contractible, may be variously modified, the preferred construction being as here shown—that is to say, each outer link is made of two sections 3 3′, the section 3 having a socket *s*, in which the section 3′ is adapted to slide lengthwise. The sliding movement of the section 3′ is limited by a stud or pin *u* thereon and a slot *t* in the socket *s*, the pin projecting through the slot and being limited in its movements by the ends of the slot. The inner portions of the links 2 2 are curved, as shown at 2' 2', the curvature being such that the mirror can be pushed back with its frame flush with the outside frame, as shown in Fig. 1, the links 2 and 3 being disposed behind the mirror.

It will be seen that the telescopic construction of the outer links 3 3 enables the mirror to be moved freely forward and backward while its face is parallel with the front of the bureau. When the mirror is thus moved, the telescopic links of the arms are extended sufficiently to permit said movement, which would be impossible, excepting to a very limited extent, if the links 3 3 were not extensible. As it is, the mirror can be moved freely forward to any desired extent. The jointed arms, arranged as shown, enable the mirror-frame to be swung freely with either edge in advance of the other, the location of the pivots 4 4 at the front of the frame $b$ enabling the mirror to swing without liability of striking the frame $b$.

The devices for limiting the sliding movement of the sections 3' 3' prevent the mirror-frame from being moved edgewise far enough to strike the outside frame.

If it is desired to permit only one edge of the mirror to be swung outwardly at a time, and that to a limited extent, the telescopic construction of the outer links may be dispensed with, said links being made incapable of extending.

I claim—

1. The jointed arms $d$ $d$, each composed of an inner and an outer link connected by vertical pivots 5 5, the inner links being curved at their inner portions and connected by vertical pivots 4 with hinge members or brackets $c$ $c$, adapted for attachment to an outside frame, while the outer links are connected at their outer ends by vertical pivots 7 7 with hinge members 6 6, adapted to be attached to a mirror-frame, said hinge members or brackets $c$ $c$ being formed to project to the front of the outside frame, to which they are attached, as set forth.

2. The combination of the fixed outside frame $b$, the mirror-frame $a$, and the jointed arms $d$ $d$, each composed of an inner and an outer link connected by vertical pivots, the inner ends being curved and connected with fixtures on the outside frame by vertical pivots located at the front surfaces of said frame, while the outer links are connected at their outer ends by vertical pivots with fixtures secured to the mirror-frame, as set forth.

3. The combination of the inner links, the hinge members or brackets $c$ $c$, connected by vertical pivots 4 with said inner links and adapted for attachment to an outside frame, the telescopic or extensible outer links connected by vertical pivots 5 with the inner links, and the hinge members 6, connected by vertical pivots with the outer ends of the telescopic links and adapted for attachment to a mirror-frame, as set forth.

4. The combination of the fixed outside frame $b$, the mirror-frame $a$, the inner links, the hinge members or brackets $c$ $c$, connected by vertical pivots 4 with said inner links and adapted for attachment to the outside frame, the telescopic or extensible outer links connected by vertical pivots 5 with the inner links, and the hinge members 6, connected by vertical pivots with the outer ends of the telescopic links and adapted for attachment to the mirror-frame, as set forth.

In testimony whereof I have signed my name to this specification, in the presence of two subscribing witnesses, this 20th day of November, A. D. 1889.

RICHARD P. ELLIOTT.

Witnesses:
C. J. HAMBLETT,
DANIEL R. MARSHALL.